United States Patent [19]

Lissau

[11] Patent Number: 4,533,115
[45] Date of Patent: Aug. 6, 1985

[54] GLADHAND WITH DIRT PROTECTION PLUG

[75] Inventor: Frederic Lissau, Chicago, Ill.

[73] Assignee: Sloan Valve Company, Franklin Park, Ill.

[21] Appl. No.: 482,502

[22] Filed: Apr. 6, 1983

[51] Int. Cl.³ ............................................. F16L 37/28
[52] U.S. Cl. .................................. 251/142; 251/229; 251/324; 251/DIG. 1; 137/381
[58] Field of Search ............... 251/142, 148, 229, 324, 251/DIG. 1, 149.6; 137/377, 381

[56] References Cited

U.S. PATENT DOCUMENTS

| | | | |
|---|---|---|---|
| 621,764 | 3/1899 | Brown | 251/149.6 |
| 729,790 | 6/1903 | Oleson | 137/614 |
| 836,344 | 11/1906 | Schumacher | 137/614 X |
| 1,155,576 | 10/1915 | Isley | 251/229 |
| 2,723,681 | 11/1955 | MacGlashan, Jr. et al. | 251/324 X |
| 2,791,238 | 5/1957 | Bryant | 251/324 X |
| 2,817,955 | 12/1957 | Mercier | 251/324 X |
| 2,946,485 | 7/1960 | Durner | 251/324 X |
| 3,554,230 | 1/1971 | Berg et al. | 137/614.04 |

FOREIGN PATENT DOCUMENTS

| | | | |
|---|---|---|---|
| 1404938 | 3/1969 | Fed. Rep. of Germany | 137/879 |
| 85028 | 5/1920 | Switzerland | 251/148 |

Primary Examiner—A. Michael Chambers
Assistant Examiner—John C. Fox
Attorney, Agent, or Firm—Kinzer, Plyer, Dorn & McEachran

[57] ABSTRACT

A combination gladhand and dirt protection plug for use in gladhand coupling applications, for example with a tractor and/or trailer. There is a gladhand body with an air inlet and an air outlet. A seal member is positioned at the air outlet and there is a chamber in the body connecting the inlet and the outlet. A dirt protection plug is positioned within the chamber and there is a handle for moving it reciprocally or coaxially in the chamber between positions opening and closing communication between said inlet and outlet. The dirt protection plug carries a nose portion which penetrates the outlet seal in the closed position of the gladhand to prevent dirt and other foreign matter from entering the gladhand body chamber. The dirt protection plug carries a closing seal which is in sealing engagement with the chamber walls to close communication between the inlet and outlet in the closed position of the plug.

3 Claims, 4 Drawing Figures

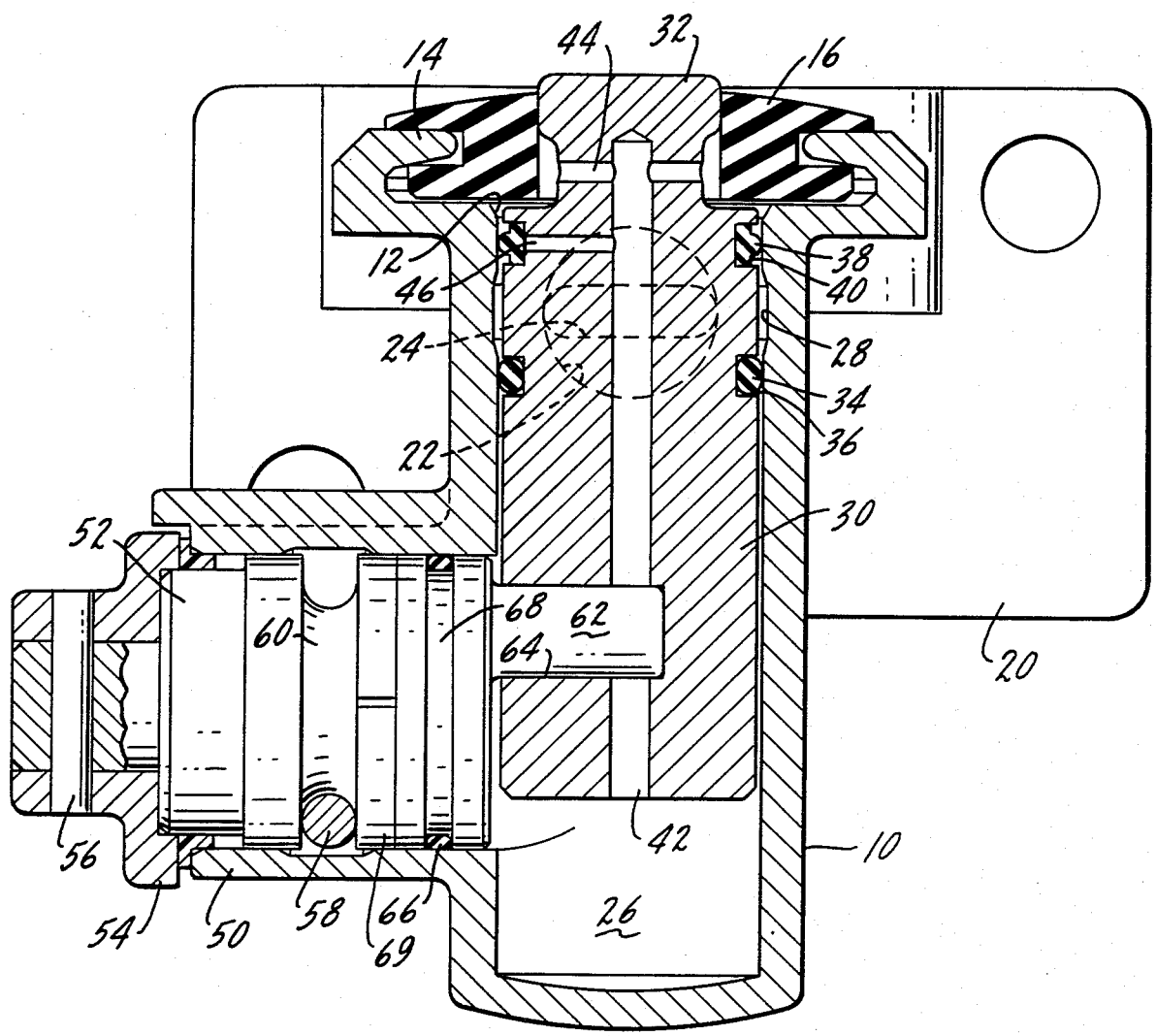

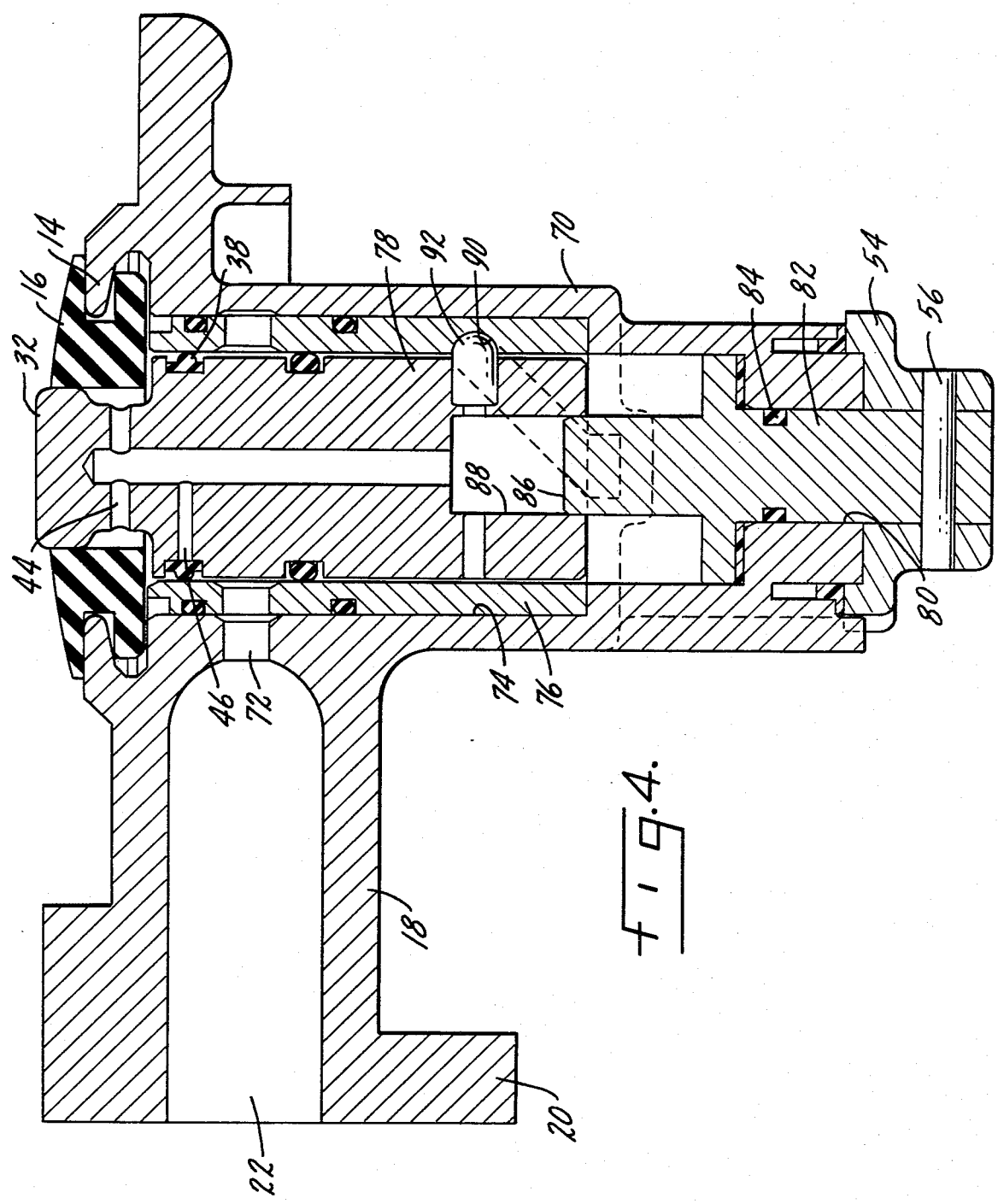

GLADHAND WITH DIRT PROTECTION PLUG

SUMMARY OF THE INVENTION

The present invention relates to gladhands of the type used in tractor and/or trailer applications and has particular application to a gladhand structure which includes a combination dirt protection plug and shutoff valve.

A primary purpose of the invention is a gladhand structure of the type described in which the dirt protection plug provides both protection against dirt entering the gladhand body and a means for shutting off communication between the inlet and the outlet.

Another purpose is a gladhand construction of the type described in which the dirt protection plug carries seal means which sealingly engage the gladhand body chamber walls to close communication between the inlet and the outlet.

Another purpose is a combination gladhand, dirt protection plug and shutoff valve in which the movable valve member is pressure balanced.

Other purposes will appear in the ensuing specification, drawings and claims.

BRIEF DESCRIPTION OF THE DRAWINGS

The invention is illustrated diagrammatically in the following drawings wherein:

FIG. 3 is an axial section along plane 3—3 of FIG. 1, and FIG. 4 is an axial section, similar to FIG. 3, but illustrating a modified embodiment of the combination gladhand and dirt protection plug.

DESCRIPTION OF THE PREFERRED EMBODIMENT

The present application describes a combination gladhand, dirt protection plug and shutoff valve which finds particular application in over the road vehicles and has utility as a part of the air system connecting a tractor to a trailer and/or connecting one trailer to a following trailer. The gladhand construction shown has application within the air system of such vehicles and although only a portion of the gladhand construction is illustrated, it is well known in the art that there is a further fitting required in a complete gladhand installation. For simplicity in description, only a portion of the gladhand construction is shown and described herein.

Reference is made to the following U.S. patents which illustrate similar types of gladhand constructions: U.S. Pat Nos. 4,109,673, 3,960,365 and 3,245,428.

Figure 1:
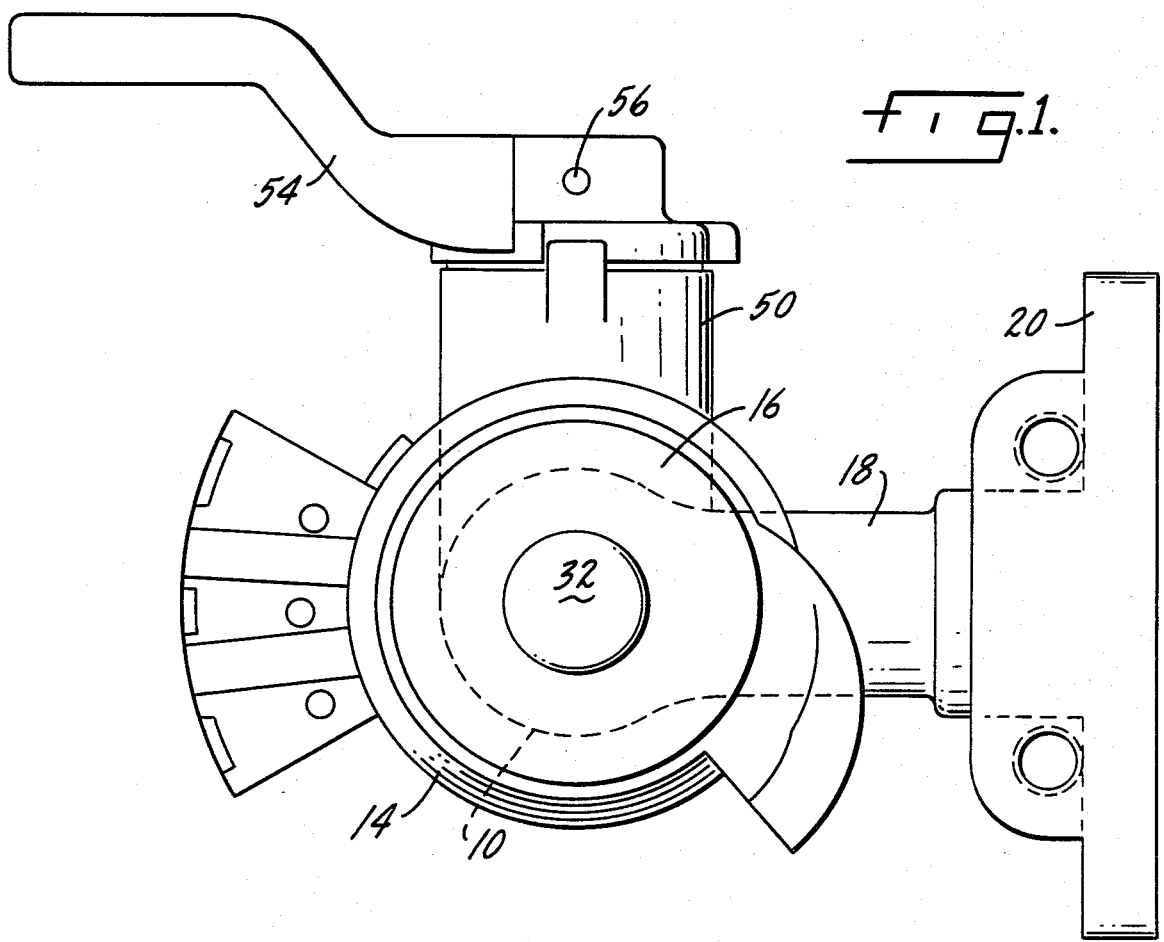
FIG. 1 is a top plan view of one embodiment of combination gladhand and dirt protection plug.
Figure 2:
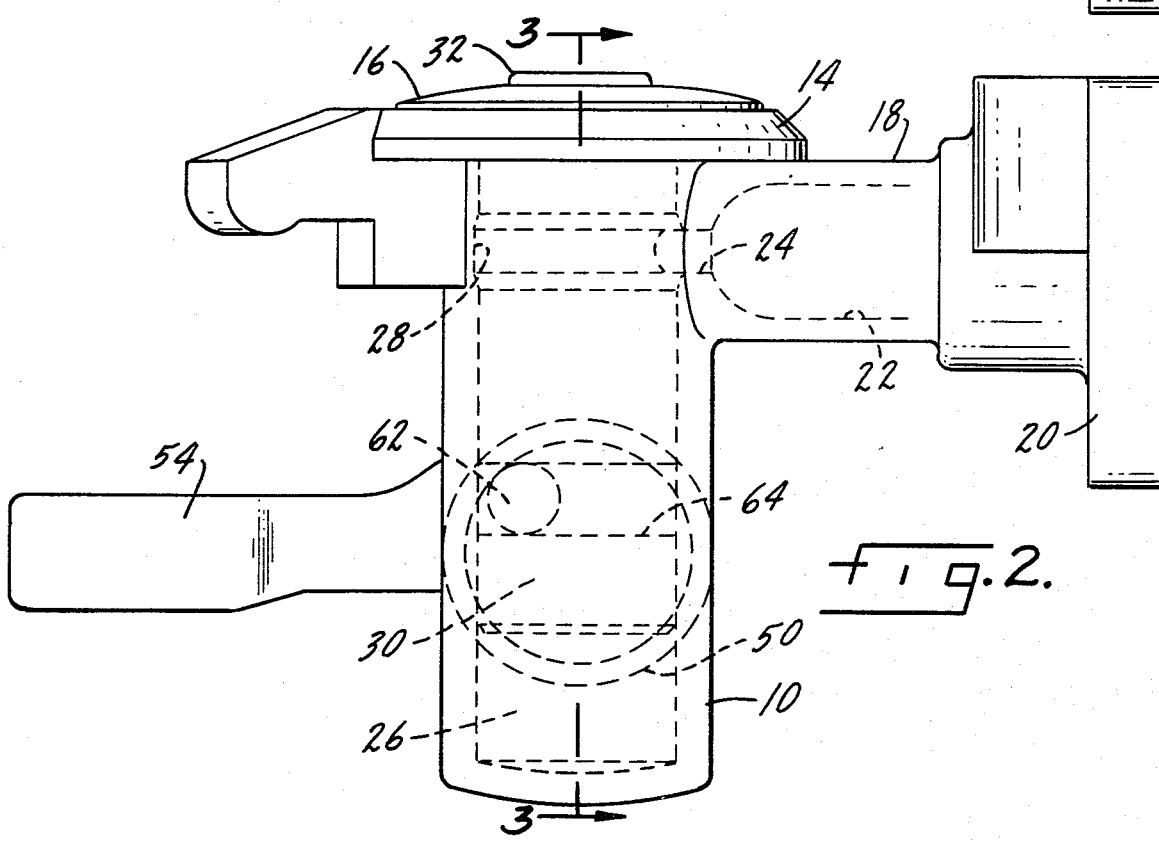
FIG. 2 is a side view of the gladhand construction of FIG. 1.

In the construction of FIGS. 1, 2 and 3, a gladhand body is indicated at 10 and includes an air outlet 12 defined by a flange construction 14. A conventional gladhand seal member 16 is carried by flange construction 14 at gladhand air outlet 12.

The inlet for the gladhand includes an outwardly extending boss or the like 18 which terminates in a mounting flange 20. Boss 18 may be integral with gladhand body 10 and may have an interior passage 22 terminating in a slot 24 which opens into an interior chamber 26 formed within gladhand body 10. A peripheral or circumferential groove 28 may be formed in the wall of chamber 26 in alignment with air inlet 24.

A dirt protection plug and valve plug 30 is mounted within chamber 26 and includes a nose portion 32 which, in the closed position of FIG. 3, penetrates the opening in seal 16. Nose portion 32 does not form a seal when so positioned, but rather forms a sufficient closure to prevent dirt from entering into the gladhand body. In effect, the nose blocks the entrance of dirt or other types of foreign matter into the gladhand chamber. Dirt valve plug 30 carries a pair of seals. A first seal 34 is positioned within a groove 36 formed in the exterior of plug 30 and a second seal 38 having a T-shaped cross section is positioned within a groove 40 in the exterior of plug 30. In the closed position of FIG. 3, seals 34 and 38 are positioned on opposite sides of circumferential groove 28. Thus, air pressure at the inlet will be equally applied to both seals, providing balanced pressure upon the seals, thereby creating no unbalancing force to move the valve plug.

Plug 30 may include an axially extending vent passage 42 which terminates in cross passages 44 in nose portion 32. Note that the cross portions open at the exterior of the plug on the outside of seal 38, thus communicating the interior of chamber 26 beneath plug 30 with the exterior or atmospheric pressure, thereby relieving any pressures which might form beneath the plug as it is moved between open and closed positions. In addition, plug 30 may include a small cross passage 46 opening into central passage 42 and terminating behind T-shaped seal 38, thus relieving any back pressure on seal 38 during movement of the valve.

Gladhand body 10 includes an outwardly extending cylindrical portion 50 mounting a handle driver 52. An exterior handle member 54 is pinned, as at 56, to handle driver 52. A pin 58, positioned within a circumferential groove 60 in handle driver 52 is used to hold the handle driver within cylindrical portion 50.

Extending inwardly from handle driver 52 is an eccentric 62, generally cylindrical in cross section, and itself extending into a cross slot 64 in plug 30. Thus, rotation of the handle and consequent rotary movement of eccentric 62 within chamber 26 is effective to move dirt protection plug and valve 30 from the closed position of FIG. 3 to an open position in which T seal 38 will be beneath air inlet slot 24, thereby opening communication between the gladhand air inlet and outlet.

A seal ring 66, positioned within a groove 68, may form a seal between handle driver 52 and the cylindrical portion 50 of gladhand body 10, thereby preventing any dirt or foreign matter from entering the chamber 26 and sealing handle opening.

FIG. 3 illustrates the closed position of the combination gladhand structure. The air pressure from the inlet applied to both seals 34 and 38 is balanced and the seals are positioned upon opposite sides of air inlet slot 24. The seals effectively close communication between the inlet and the outlet. Rotation of handle driver 52 will cause eccentric 62 to move dirt protection plug 30 downwardly within chamber 26. The vent passage between the interior of the chamber and exterior of the described seal construction permits the dirt protection plug to be easily moved and prevents any pressure buildup behind the plug. Similarly, as the plug is moved there will be no back pressure applied to T seal 38 because of vent passage 46.

When the gladhand is pressurized, the handle driver 52 is pressure unbalanced. To minimize friction caused at this unbalance a split Teflon ring 69 is installed to bear against pin 58.

FIG. 4 illustrates a modified embodiment of the invention, the principal difference being in the manner in which the dirt protection plug is moved between open and closed positions. Similar parts have been given similar numbers.

A gladhand body 70 has an air inlet slot 72. A chamber 74 is formed within body 70 and a cylindrical bushing 76 is positioned within the chamber with the bushing mounting dirt protection plug 78 similar in construction, as far as the seal and passage means with the device in FIGS. 1-3.

Body 70 has an opening 80 at one end thereof and a handle driver 82 extends through the opening. A seal 84 is positioned within a groove in the handle driver and is in sealing engagement with opening 80. Handle driver 82 exteriorly mounts a handle, as in the FIG. 1-3 construction, and itself has an interior projection 86 which is positioned within a slot 88 in dirt protection plug 78. Thus, rotation of handle driver 82 will rotate the dirt protection plug.

The interior wall of bushing 76 has a diagonal slot or groove 90 and dirt protection plug 78 carries a projection or pin 92 which extends within the slot. Thus, rotation of dirt protection plug 78 brought about by rotation of handle driver 82 is effective to cause reciprocal movement of the dirt protection plug within the gladhand body chamber 74 between the closed position of FIG. 4 and an open position in which the dirt protection plug seals have moved away from air inlet 72 permitting communication between the body inlet and the outlet.

The FIG. 4 construction, as indicated above, includes the same spaced seal members and vent passages, the principal difference being that the seal members bear against bushing 76 rather than against the interior wall of the gladhand body chamber. In other respects, the structures are generally similar.

Of importance in the invention is the use of a single reciprocally moving plug to provide protection against foreign matter entering the gladhand, and to provide the on-off functions of the valve. The dirt protection plug seals bear against the chamber wall providing a positive and effective seal between the inlet and the outlet. The seals carried by the dirt protection plug are balanced so that air pressure at the inlet will not cause any undesired movement of the valve. Further, there are appropriate vent passages to insure smooth and efficient operation of the valve between open and closed positions and to insure that the seals are not blown out by air pressure, but remain fast in their desired positions.

Whereas the preferred form of the invention has been shown and described herein, it should be realized that there may be many modifications, substitutions and alterations thereto.

The embodiments of the invention in which an exclusive property or privilege is claimed are defined as follows:

1. A combination gladhand and dirt protection plug for use in gladhand coupling applications including a gladhand body having an air inlet and an air outlet, a seal member positioned to said air outlet, a chamber in said body connecting said inlet and outlet, a dirt protection plug in said chamber and an exterior handle for moving it between positions opening and closing communication between said inlet and outlet, said dirt protection plug carrying a nose portion which penetrates said outlet seal in the closed position and is in peripheral contact therewith to prevent dirt and other foreign matter from entering said chamber, closing seal means to close communication between said inlet and outlet in the closed position of said plug including spaced seal rings carried by said plug and in sealing engagement with said chamber wall, said spaced seal rings being positioned on opposite sides of said air inlet when said plug is in the closed position, vent passage means in said plug connecting opposite ends thereof to relieve pressure upon said plug during movement thereof, said vent passage means extending to an area behind said one of said seal rings closest to said nose and the exterior of said dirt protection plug to relieve back pressure thereupon.

2. The gladhand of claim 1 further characterized in that said handle includes an eccentric extending outwardly from said handle and into driving engagement with said dirt protection plug, said handle being non-coaxially arranged relative to said plug.

3. The gladhand of claim 1 further characterized in that said handle is positioned exteriorly of said gladhand body for moving said dirt protection plug, said handle being coaxially arranged relative to said plug.

* * * * *